(12) United States Patent
Nakagawa (10) Patent No.: US 10,071,663 B2
(45) Date of Patent: *Sep. 11, 2018

(54) VEHICLE SEAT

(71) Applicant: TOYOTA BOSHOKU KABUSHIKI KAISHA, Aichi-ken (JP)

(72) Inventor: Tetsuo Nakagawa, Aichi-Ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 69 days.

This patent is subject to a terminal disclaimer.

(21) Appl. No.: 15/219,890

(22) Filed: Jul. 26, 2016

(65) Prior Publication Data

US 2017/0028942 A1 Feb. 2, 2017

(30) Foreign Application Priority Data

Jul. 31, 2015 (JP) ................................ 2015-151678

(51) Int. Cl.
*A47C 7/62* (2006.01)
*B60N 2/90* (2018.01)
*B60N 2/60* (2006.01)
*B60N 2/68* (2006.01)
*B60N 2/02* (2006.01)
*B60R 16/023* (2006.01)

(52) U.S. Cl.
CPC .............. *B60N 2/90* (2018.02); *B60N 2/0228* (2013.01); *B60N 2/6009* (2013.01); *B60N 2/682* (2013.01); *B60R 16/0239* (2013.01)

(58) Field of Classification Search
CPC .......... B60N 2/60; B60N 2/44; B60N 2/6009; B60N 2/0228; B60N 2/682; B60N 2/5816; B60N 2/5825; B60N 2/72; B60R 16/0239; B60R 13/02
USPC ..... 297/217.5, 217.3, 452.38, 452.48, 463.1, 297/463.2
See application file for complete search history.

(56) References Cited

U.S. PATENT DOCUMENTS

| 5,228,659 A | * | 7/1993 | Potes, Jr. | ............. B60N 2/0705 248/429 |
| 5,288,133 A | * | 2/1994 | Mizushima | .......... B60N 2/0705 248/345.1 |
| 6,149,241 A | * | 11/2000 | Waku | ..................... B60N 2/015 297/452.38 |

(Continued)

FOREIGN PATENT DOCUMENTS

| CN | 101676144 A | 3/2010 |
| CN | 102529759 A | 7/2012 |

(Continued)

OTHER PUBLICATIONS

Office Action issued in Chinese family member Patent Appl. No. 201610617142.1, dated Mar. 27, 2018, along with a partial English translation thereof.

*Primary Examiner* — Chi Q Nguyen
(74) *Attorney, Agent, or Firm* — Greenblum & Bernstein, P.L.C.

(57) ABSTRACT

A vehicle seat includes: a seat cushion; a shield attached to a side face portion of the seat cushion; an electrical component disposed between the side face portion and the shield; and a hood portion provided above the electrical component between the side face portion and the shield so as to cover at least part of the electrical component.

6 Claims, 6 Drawing Sheets

(56) References Cited

U.S. PATENT DOCUMENTS

| | | | | |
|---|---|---|---|---|
| 7,237,846 B1* | 7/2007 | Arima | ............... | B60N 2/6009 |
| | | | | 297/452.18 |
| 7,973,105 B2* | 7/2011 | Armini | ............... | B24B 37/044 |
| | | | | 524/493 |
| 8,678,507 B2* | 3/2014 | Yamazaki | ............... | B60N 2/44 |
| | | | | 297/452.38 |
| 9,744,883 B2* | 8/2017 | Nakagawa | ............... | B60N 2/44 |
| 9,821,690 B2* | 11/2017 | Nakagawa | ............... | B60N 2/6009 |
| 2009/0146485 A1* | 6/2009 | Inagaki | ............... | B60N 2/0224 |
| | | | | 297/463.1 |
| 2010/0072804 A1* | 3/2010 | Stauske | ............... | B60N 2/5621 |
| | | | | 297/452.38 |
| 2012/0169101 A1* | 7/2012 | Suzuki | ............... | B60N 2/12 |
| | | | | 297/354.1 |
| 2012/0313408 A1* | 12/2012 | Nagata | ............... | B60N 2/4235 |
| | | | | 297/216.1 |
| 2013/0313099 A1 | 11/2013 | Komaki et al. | | |

FOREIGN PATENT DOCUMENTS

| | | |
|---|---|---|
| CN | 103448586 A | 12/2013 |
| CN | 103963672 A | 8/2014 |
| JP | 2002-193049 | 7/2002 |
| JP | 2013001149 A | 1/2013 |

* cited by examiner

VEHICLE SEAT

INCORPORATION BY REFERENCE

The disclosure of Japanese Patent Application No. 2015-151678 filed on Jul. 31, 2015 including the specification, drawings and abstract is incorporated herein by reference in its entirety.

BACKGROUND OF THE INVENTION

1. Field of the Invention

The present invention relates to a vehicle seat.

2. Description of Related Art

There has been known a vehicle seat configured such that a shield is attached to a side face portion of a seat cushion. In the invention disclosed in Japanese Patent Application Publication No. 2002-193049 (JP 2002-193049 A), an electrical component is disposed in a space between a side face portion of a seat cushion and a shield. Since the side face portion of the seat cushion makes close contact with an upper end of the shield, a foreign matter hardly enters from this part into a space between the side face portion of the seat cushion and the shield.

SUMMARY OF THE INVENTION

In the invention disclosed in JP 2002-193049 A, although there is no problem in a normal state, when a part between the side face portion of the seat cushion and the upper end of the shield is enlarged forcibly for some reasons, a foreign matter enters from the enlarged part into the space between the side face portion of the seat cushion and the shield and the foreign matter abuts with the electrical component, which may cause a malfunction.

The present invention provides a vehicle seat that restrains an occurrence of a malfunction by restraining a foreign matter from abutting with an electrical component even if the foreign matter enters from above into a space between a side face portion of a seat cushion and a shield for some reasons.

A vehicle seat according to an aspect of the present invention includes: a seat cushion; a shield attached to a side face portion of the seat cushion; an electrical component disposed between the side face portion and the shield; and a hood portion provided above the electrical component between the side face portion and the shield so as to cover at least part of the electrical component.

According to the aspect, the hood portion is provided above the electrical component. Accordingly, even when a foreign matter enters from above into a space between the side face portion of the seat cushion and the shield, it is possible to restrain an occurrence of a malfunction by restraining the foreign matter from abutting with at least part of the electrical component.

In the above aspect, an upper part of the hood portion may be at least partially inclined, and a space between the side face portion and the shield may be opened downward.

According to the above configuration, when the foreign matter abuts with the hood portion, the foreign matter moves on the hood portion due to gravity, so that the foreign matter easily falls from a lower end of the hood portion. The foreign matter thus falling is discharged from a lower side of the space between the side face portion of the seat cushion and the shield. Accordingly, it is possible to restrain the foreign matter from remaining in the space between the side face portion of the seat cushion and the shield.

In the above configuration, the hood portion may be a planar body formed in a shed-roof shape.

According to the above configuration, it is possible to obtain the same effect as above with a relatively simple configuration.

In the above configuration, the hood portion may be provided with an upright wall portion that guides a foreign matter to a lower end of a shed-roof shape of the hood portion when the foreign matter entering from above into the space between the side face portion and the shield abuts with the hood portion and moves on the hood portion due to gravity.

According to the above configuration, when the foreign matter abutting with the hood portion moves on the hood portion due to gravity, it is possible to restrain the foreign matter from falling from the hood portion halfway without moving to the lower end of the hood portion. This makes it easy to guide the foreign matter to a direction where the foreign matter hardly affects the electrical component.

In the above aspect, the electrical component and the hood portion may be both attached to the shield.

In a structure in which the electrical component and the hood portion are separately attached to the side face portion of the seat cushion and the shield, the electrical component might interfere with the hood portion at a time when the shield is attached to the side face portion of the seat cushion. According to the above configuration, when the electrical member and the hood portion are both attached to the shield and the shield is then attached to the side face portion of the seat cushion, it is possible to restrain the electrical component from interfering with the hood portion, thereby making it possible to improve attachment workability of the shield.

In the above aspect, the hood portion may be integrated with the shield.

With the above configuration, it is possible to reduce the number of components in comparison with a case where the hood portion is provided separately.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIGS. 1 to 6 illustrate one embodiment of the present invention. The present embodiment is an example in which the present invention is applied to a seat cushion of a vehicle seat. In each of the figures, each direction of a vehicle at a time when the vehicle seat is attached to the vehicle is indicated by an arrow. In the following description, a description related to a direction shall be made on the basis of this direction.

Figure 1:
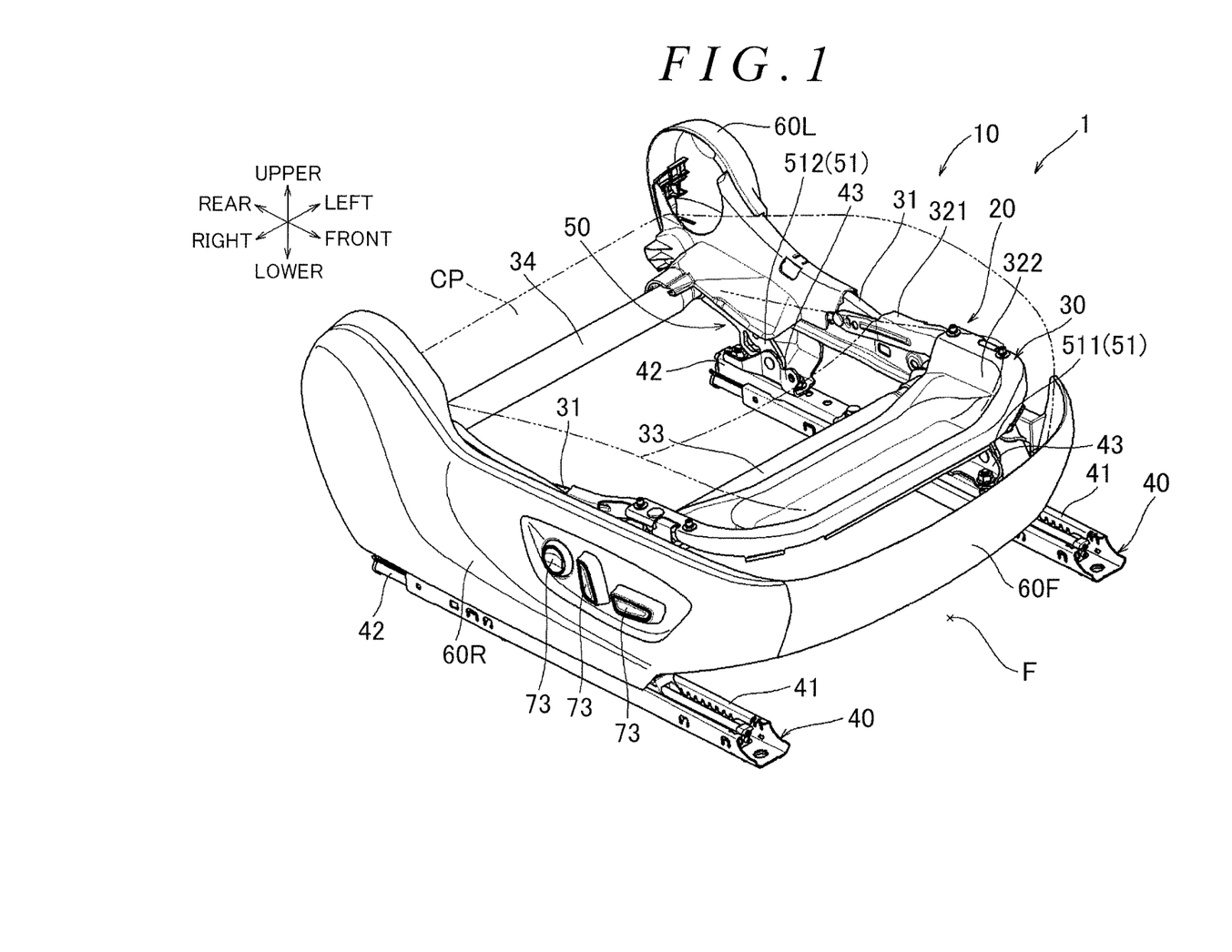
FIG. 1 is a perspective view illustrating a seat cushion of a vehicle seat according to one embodiment of the present invention.

As illustrated in FIG. 1, a seat cushion 10 of a vehicle seat 1 is configured such that a cushion pad CP, which is a cushioning material, is placed on a metal cushion frame 20 forming a framework, and then covered with a cushion cover (not illustrated) from above. A shield 60R is attached to a right side face portion of the seat cushion 10, a shield 60L is attached to a left side face portion thereof, and a shield 60F is attached to a front surface portion thereof. Since the cushion pad CP and the shields 60L, 60F have well-known configurations, descriptions thereof are omitted. The following describes the cushion frame 20 and the shield 60R.

As illustrated in FIG. 1, the cushion frame 20 is constituted by a frame body portion 30, a slide rail 40, and a lifter mechanism 50.

Figure 3:
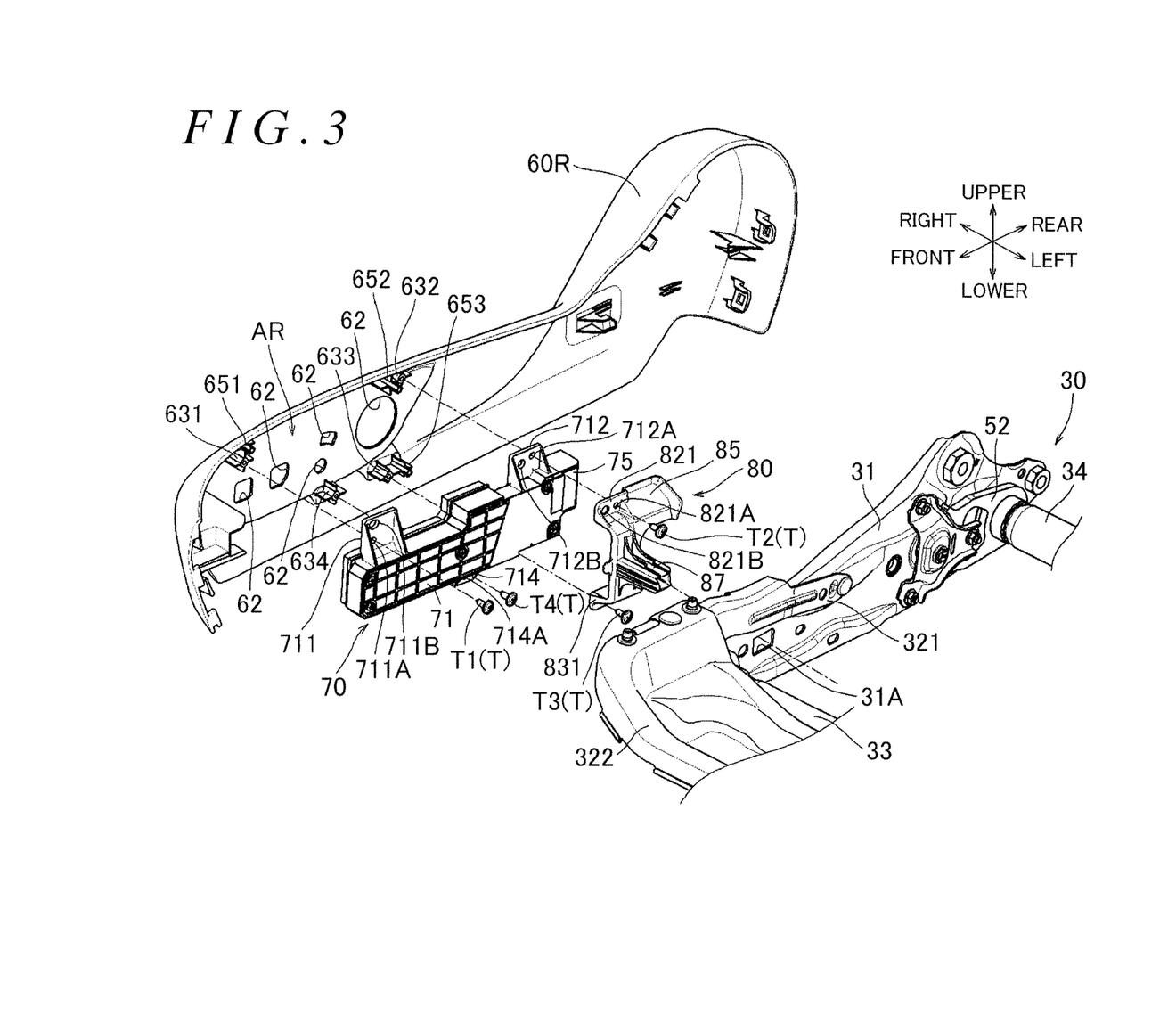
FIG. 3 is a view illustrating a right side frame in addition to an exploded perspective view of the right shield according to the above embodiment.

As illustrated in FIGS. 1 and 3, the frame body portion 30 is a structure formed in a generally square-frame shape in a top view, and includes: two side frames 31 on fiat and left sides; a front pipe 33 provided in a bridging manner between front ends of the right and left side frames 31 so as to be attached thereto; and a rear pipe 34 provided in a bridging manner between rear ends of the right and left side frames 31. Further, the frame body portion 30 also includes: panel arms 321 one ends of which are attached to respective side frames 31 at positions slightly rearward relative to the front pipe 33; and a front panel 322 connecting the other ends of the right and left panel arms 321. The one end of the panel arm 321 is supported by the side frame 31 pivotably in an up-down direction. This allows the front panel 322 to adjust its inclination angle relative to the side frame 31. The front pipe 33 and the rear pipe 34 are attached to the side frames 31 in a rotatable manner. An upper end of the after-mentioned lifter link 51 of the lifter mechanism 50 is attached to right and left ends of the front pipe 33 and the rear pipe 34 in a non-rotatable manner relative to the front pipe 33 and the rear pipe 34. Further, upper sides of rear ends of the side frames 31 are connected to a lower end of a seatback (not shown), which is a backrest portion of the vehicle seat 1, via a recliner (not shown). This allows the seatback to adjust its inclination angle relative to the seat cushion 10. A locking hole 31A is formed in a penetrating manner in the right side frame 31, slightly on a front side relative to a central part thereof in a front-rear direction. The locking hole 31A is a square hole through which a connection protruding portion 87 of the after-mentioned locking bracket 80 can be passed.

As illustrated in FIG. 1, the slide rail 40 includes a lower rail 41 fixed to a floor F and extending in the front-rear direction, and an upper rail 42 slidably assembled to the lower rail 41. Brackets 43 are attached to an upper face portion of the upper rail 42, at two places on front and back sides. A lower end of the after-mentioned lifter link 51 of the lifter mechanism 50 is supported by the bracket 43 in a rotatable manner in the up-down direction. That is, the side frame 31 of the frame body portion 30 is connected to the slide rail 40 via the lifter link 51.

As illustrated in FIG. 1, the lifter mechanism 50 is mainly constituted by the lifter link 51, the front pipe 33 and the rear pipe 34 of the frame body portion 30, and a brake mechanism (not shown). The lifter link 51 includes: two front links 511 (the front link 511 on the right side is not illustrated) on the right and left sides of a front side; and two rear links 512 (the rear link 512 on the right side is not illustrated) on the right and left sides of a rear side. As described above, an upper end of the front link 511 is connected to the front pipe 33 in a non-rotatable manner relative to the front pipe 33, and a lower end thereof is supported by the bracket 43 in a rotatable manner in the up-down direction. An upper end of the rear link 512 is connected to the rear pipe 34 in a non-rotatable manner relative to the rear pipe 34, and a lower end thereof is supported by the bracket 43 in a rotatable manner in the up-down direction. As illustrated in FIG. 3, a sector gear 52 is attached to the rear pipe 34 in a non-rotatable manner relative to the rear pipe 34, in the vicinity of a left face portion of the right side frame 31. The sector gear 52 is engaged with a pinion gear (not shown) of a brake mechanism attached to the right side frame 31. When the pinion gear of the brake mechanism rotates, the sector gear 52 rotates and the rear pipe 34 rotates. When the rear pipe 34 rotates, the rear link 512 is to rotate in the up-down direction around the rear pipe 34, so the front link 511 swings back and forth in synchronization with the rear link 512. Hereby, a height position of the frame body portion 30 with respect to the floor F is adjustable.

Figure 4:
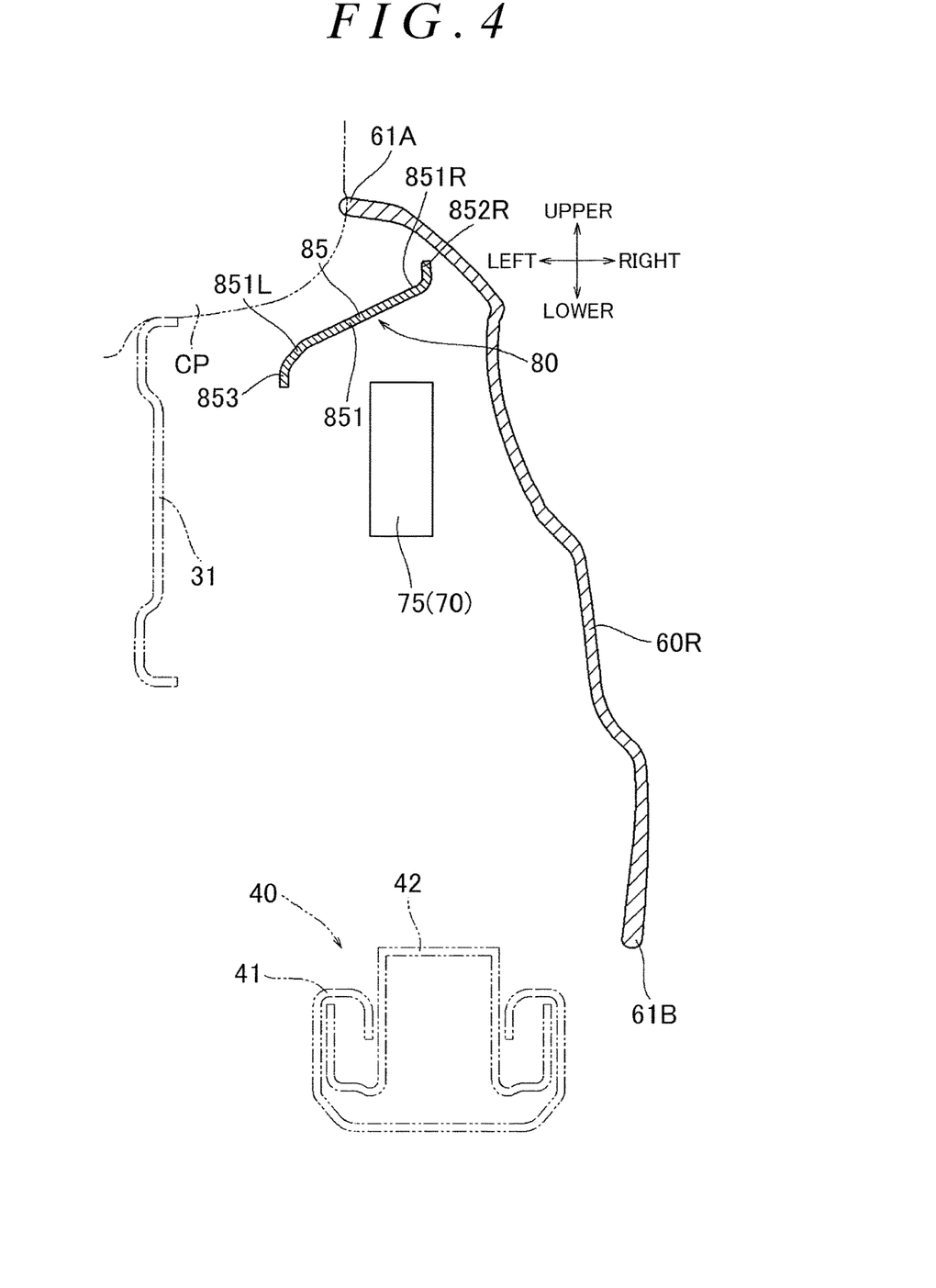
FIG. 4 is a sectional view taken along an arrow IV-IV in FIG. 2.

The shield 60R is a so-called outer shield. As illustrated in FIG. 1, the shield 60R is a resin product elongated in the front-rear direction and mainly covering the right side frame 31 from the right side. Note that a detailed description about a so-called inner shield (not shown) that covers a rear end of the right side frame 31 from the left side is omitted. As illustrated in FIG. 4, when the shield 60R is attached to the right side face portion of the seat cushion 10, an upper end 61A of the shield 60R is placed on the left side relative to a lower end 61B of the shield 60R. On this account, a space between the right side frame 31 and the shield 60R is opened downward. At this time, the upper end 61A of the shield 60R is pressed against a right side face portion of the cushion pad CP so as to make close contact therewith. As illustrated in FIG. 3, an attachment region AR is formed in a left side face portion of the shield 60R from around a front end to a central part in the front-rear direction. The attachment region AR is a region to which the after-mentioned switch member 70 and the after-mentioned locking bracket 80 are attached.

As illustrated in FIG. 3, in the attachment region AR, a plurality of holes 62, a plurality of internal screw thread portions (four internal screw thread portions 631, 632, 633, 634 in total in the present embodiment), and a plurality of projection portions (three projection portions 651, 652, 653 in total in the present embodiment) are formed. The holes 62 are through-holes via which the after-mentioned operating portion 73 is attached to the switch member 70 from the right side of the shield 60R at a time when a body portion 71 of the after-mentioned switch member 70 is attached to the attachment region AR. The internal screw thread portions are columnar bodies provided so as to project leftward from a left surface of the shield 60R, and internal thread holes are formed on respective left end surfaces thereof such that screw threads T can be screwed therein. The internal screw thread portions include: a first internal screw thread portion 631 formed in an upper part on a front side of the attachment region AR; a second internal screw thread portion 632 formed in an upper part on a rear side thereof; a third internal screw thread portion 633 formed in a lower part on the rear side thereof; and a fourth internal screw thread portion 634 formed in a lower part of a center thereof in the front-rear direction. The projection portions are columnar bodies provided so as to project leftward from the left surface of the shield 60R. The projection portions are formed in the vicinities of the first internal screw thread portion 631, the second internal screw thread portion 632, and the third internal screw thread portion 633, respectively. That is, the projection portions include: a first projection portion 651 formed integrally with the first internal screw thread portion 631 so as to be positioned in the vicinity of an upper side of the first internal screw thread portion 631; a second projection portion 652 formed integrally with the second internal screw thread portion 632 so as to be positioned in the vicinity of a front side of the second internal screw thread portion 632; and a third projection portion 653 formed integrally with the third internal screw thread portion 633 so as to be positioned in the vicinity of a rear side of the third internal screw thread portion 633. Left ends of the first projection portion 651, the second projection portion 652, and the third projection portion 653 project leftward relative to left ends of the first internal screw thread portion 631, the second internal screw thread portion 632, and the third internal screw thread portion 633, respectively.

Figure 2:
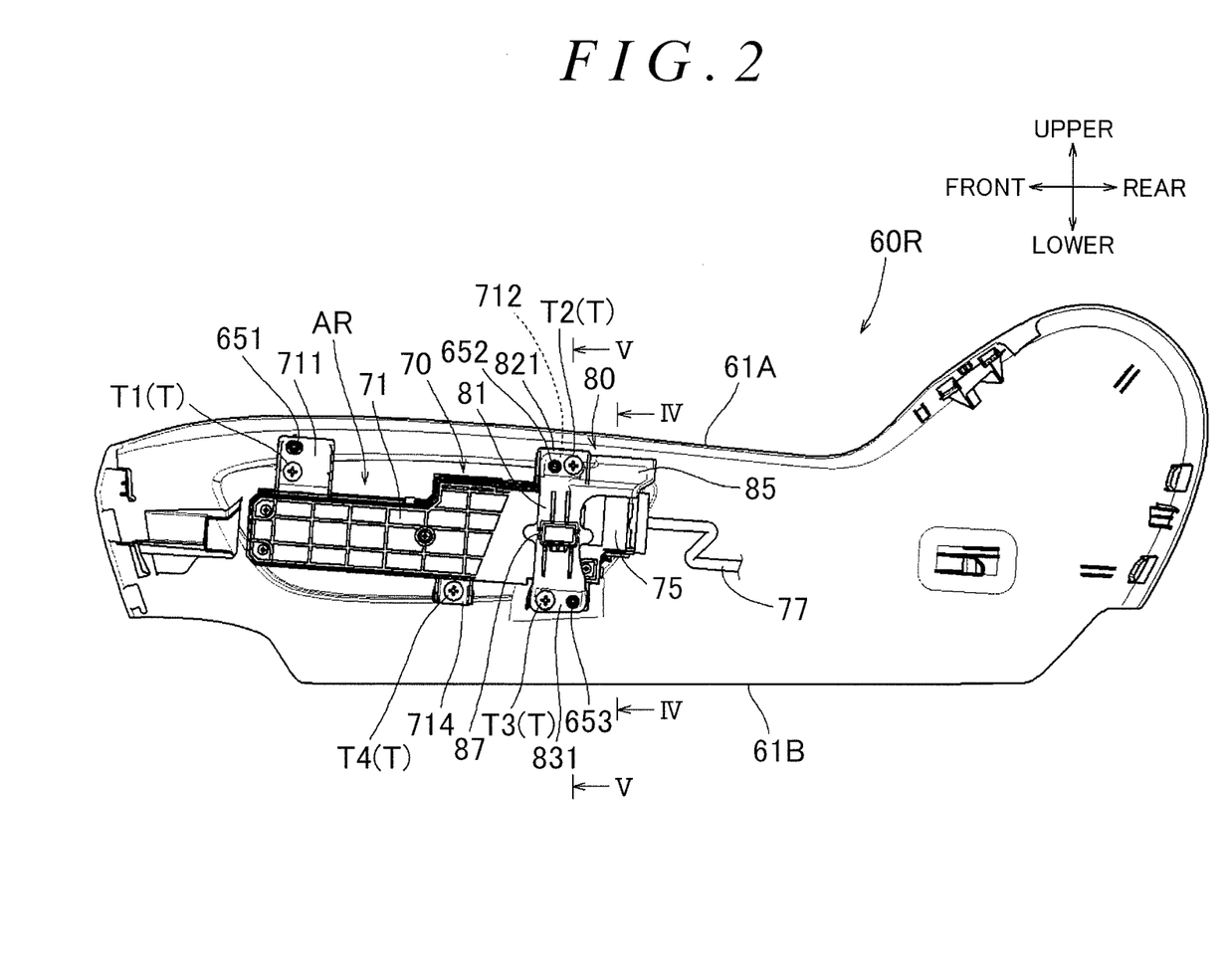
FIG. 2 is a left side view of a right shield according to the above embodiment.

The switch member 70 is an electrical component to which the operating portion 73 (see FIG. 1) is connected. The operating portion 73 is operable by a sitting person. The switch member 70 is configured as follows: when the switch member 70 detects the operating portion 73 being operated, the switch member 70 sends a signal to an electronic control unit (not shown) of a drive motor (not shown) that operates the panel arm 321, the slide rail 40, a recliner, the lifter mechanism 50, and so on. As illustrated in FIGS. 2 and 3, the switch member 70 is mainly constituted by the body portion 71 and a connector portion 75. The switch member 70 is an example of an "electrical component" in Claims.

As illustrated in FIGS. 2 and 3, the body portion 71 is a component configured such that an electrical component as a main part of the switch member 70 is covered with an outer shell having a generally box-like shape. The body portion 71 includes a front flange portion 711 extending upward from an upper part on a front side of the outer shell, a rear flange portion 712 extending upward from an upper part on a rear side thereof, and a central flange portion 714 extending downward from a central lower part thereof. More specifically, as illustrated in FIG. 3, when the body portion 71 is attached to the attachment region AR of the shield 60R, the front flange portion 711 is formed at a position corresponding to the first internal screw thread portion 631 and the first projection portion 651, the rear flange portion 712 is formed at a position corresponding to the second internal screw thread portion 632 and the second projection portion 652, and the central flange portion 714 is formed at a position corresponding to the fourth internal screw thread portion 634. Each of the front flange portion 711, the rear flange portion 712, and the central flange portion 714 has: a screw-thread hole configured such that a shaft portion of a screw thread T can be passed therethrough continuously with its corresponding internal screw thread portion, but a head of the screw thread T cannot be passed therethrough; and a positioning hole through which its corresponding projection portion can be passed. That is, the front flange portion 711 has a screw-thread hole 711A corresponding to the first internal screw thread portion 631, and a positioning hole 711B corresponding to the first projection portion 651. The rear flange portion 712 has a screw-thread hole 712A corresponding to the second internal screw thread portion 632, and a positioning hole 712B corresponding to the second projection portion 652. The central flange portion 714 has a screw-thread hole 714A corresponding to the fourth internal screw thread portion 634. The operating portion 73 (see FIG. 1) is attached to a right side face portion of the body portion 71. The operating portion 73 is a knob to be gripped by the sitting person sitting on a vehicle seat 1 for operation. The operating portion 73 is connected to the body portion 71 through the hole 62 (see FIG. 3) from the right side of the shield 60R in a state where the body portion 71 is attached to the attachment region AR.

The connector portion 75 is a part of the switch member 70, and is a part that is highly necessary to be protected so that a foreign matter does not abut therewith. The connector portion 75 has a generally box-like shape, and as illustrated in FIG. 2, the connector portion 75 is formed integrally with a rear end of the body portion 71. A communicating hole (not shown) that can be connected to a terminal portion (not shown) attached to a front end of a wiring harness 77 is formed in a rear end of the connector portion 75. When the terminal portion of the wiring harness 77 is connected to the communicating hole of the connector portion 75, the body portion 71 is electrically connected to the wiring harness 77 via the connector portion 75. The wiring harness 77 is formed by bundling a plurality of electric wires in an integrated manner, and is a cable material for supplying power to the body portion 71 and for sending a signal of the body portion 71 to the electronic control unit described above.

The locking bracket 80 is a resin member attached to the attachment region AR of the shield 60R. The locking bracket 80 is formed generally in a lateral Y-shape in a rear view. More specifically, as illustrated in FIG. 6, the locking bracket 80 mainly includes: a vertically extending portion 81 that extends in the up-down direction; a bilaterally extending portion 82 provided on an upper side so as to extend in the right-left direction from an upper end of the vertically extending portion 81; a bilaterally extending portion 83 provided on a lower side so as to extend in the right-left direction from a lower end of the vertically extending portion 81; a hood portion 85 continuously and integrally extending rearward from a rear end of the bilaterally extending portion 82 on the upper side; and a connection protruding portion 87 projecting leftward from a center of the vertically extending portion 81 in the up-down direction.

Figure 6:
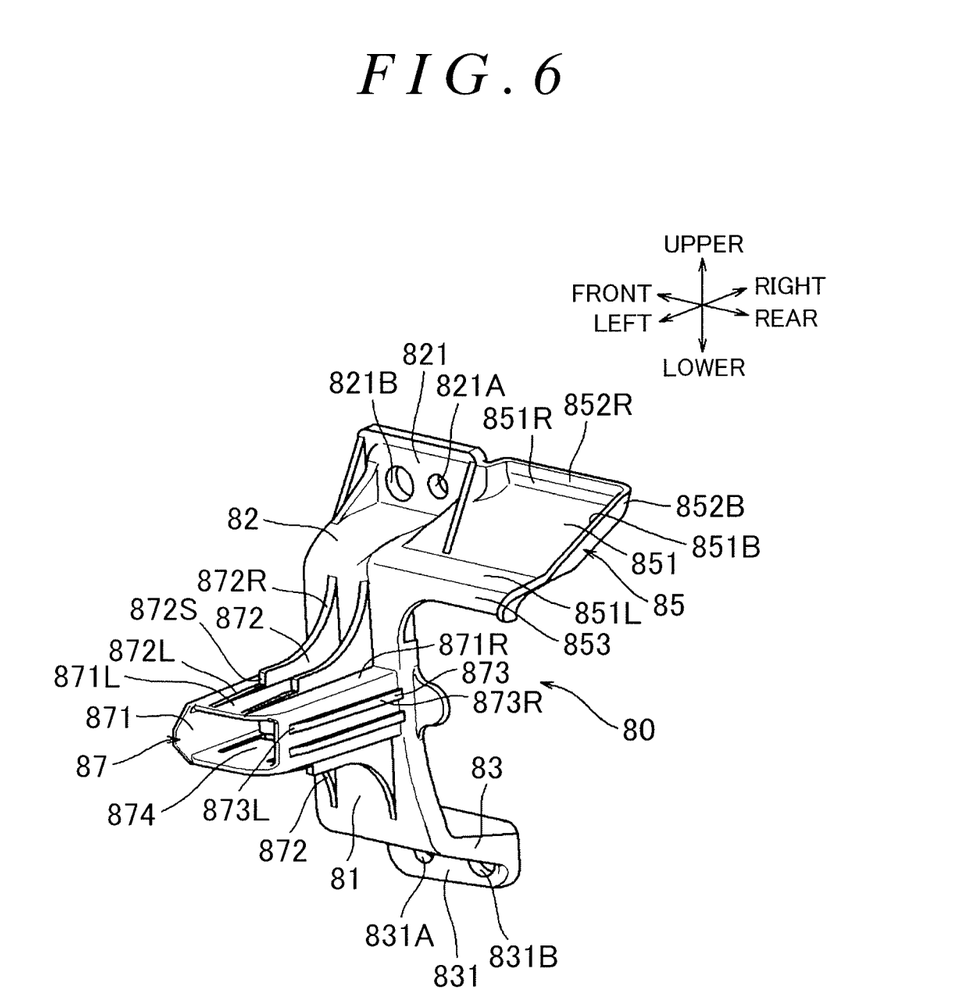
FIG. 6 is a perspective view of a locking bracket according to the above embodiment.

As illustrated in FIG. 6, an upper flange portion 821 extending upward is formed in a right end of the bilaterally extending portion 82 on the upper side, and a lower flange portion 831 extending downward is formed in a right end of the bilaterally extending portion 83 on the lower side. As illustrated in FIGS. 3 and 6, when the locking bracket 80 is attached to the attachment region AR of the shield 60R, the upper flange portion 821 is formed at a position corresponding to the second internal screw thread portion 632 and the second projection portion 652, and the lower flange portion 831 is formed at a position corresponding to the third internal screw thread portion 633 and the third projection portion 653. Each of the upper flange portion 821 and the lower flange portion 831 has: a screw thread hole configured such that a shaft portion of a screw thread T can be passed therethrough continuously with its corresponding internal screw thread portion, but a head of the screw thread T cannot be passed therethrough; and a positioning hole through which its corresponding projection portion can be passed. That is, the upper flange portion 821 has a screw-thread hole 821A corresponding to the second internal screw thread portion 632, and a positioning hole 821B corresponding to the second projection portion 652, and the lower flange portion 831 has a screw-thread hole 831A corresponding to the third internal screw thread portion 633, and a positioning hole 831B corresponding to the third projection portion 653.

As illustrated in FIG. 6, the hood portion 85 is a planar body formed so as to continuously and integrally extend rearward from the rear end of the bilaterally extending portion 82 on the upper side. The hood portion 85 is formed in a so-called shed-roof shape. More specifically, the hood portion 85 includes: a slope face portion 851 gradually inclined downward from the right side toward the left side; an upright wall portion 852R extending upward from a right end 851R of the slope face portion 851; an upright wall portion 852B extending upward from a rear end 851B of the slope face portion 851; and a suspended portion 853 extending downward from a left end 851L of the slope face portion 851. As illustrated in FIG. 4, the hood portion 85 is configured to be positioned above the connector portion 75 of the switch member 70 so as to cover an upper side of the connector portion 75 at a time when the locking bracket 80 is attached to the attachment region AR of the shield 60R. At this time, the right end 851R of the slope face portion 851 is positioned on the right side relative to the upper end 61A of the shield 60R, and the left end 851L of the slope face portion 851 is positioned on the left side relative to a left end face of the connector portion 75. The left end 851L of the slope face portion 851 is an example of a "lower end of a shed-roof shape" in Claims.

As illustrated in FIG. 3, when the locking bracket 80 is attached to the attachment region AR of the shield 60R and the shield 60R is then attached to the right side frame 31, the connection protruding portion 87 is provided at a position where the connection protruding portion 87 is opposed to the locking hole 31A of the side frame 31. As illustrated in FIG. 6, the connection protruding portion 87 is mainly constituted by a rectangular cylindrical portion 871, first reinforcing portions 872, and second reinforcing portions 873.

Figure 5:
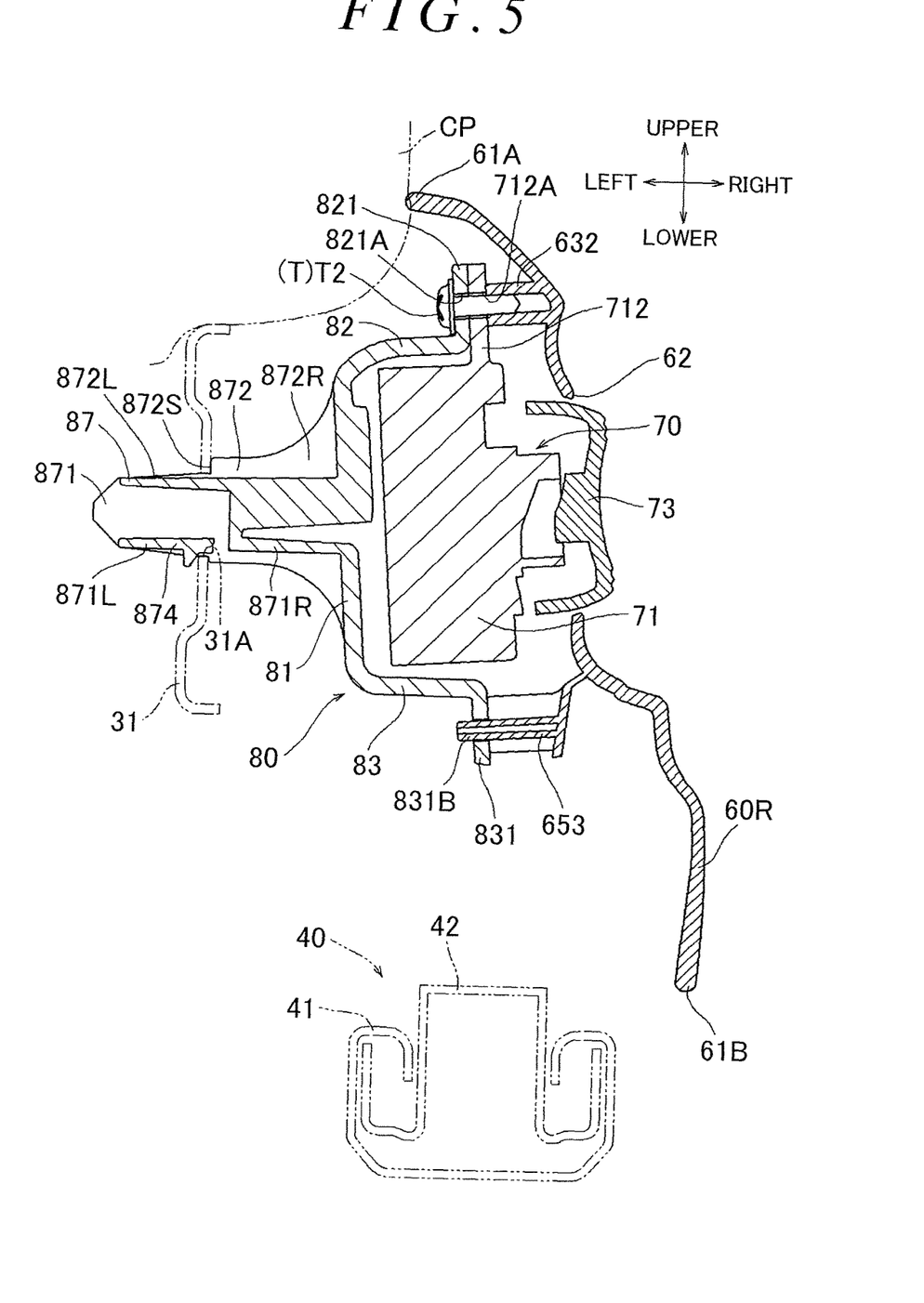
FIG. 5 is a sectional view taken along an arrow V-V in FIG. 2.

As illustrated in FIGS. 3 and 6, the rectangular cylindrical portion 871 is formed in a tubular shape that is opened on the left side, and a thickness thereof is slightly thinner than the locking hole 31A of the side frame 31. When the connection protruding portion 87 is inserted into the locking hole 31A of the side frame 31, a left part 871L of the rectangular cylindrical portion 871 is positioned on the left side of the side frame 31 and a right part 871R of the rectangular cylindrical portion 871 is positioned on the right side of the side frame 31. As illustrated in FIGS. 5 and 6, an engaging pawl 874 is formed on a bottom face of the left part 871L of the rectangular cylindrical portion 871. The engaging pawl 874 is configured to engage with a lower peripheral part of the locking hole 31A due to an elastic restoring force at a time when the connection protruding portion 87 is inserted into the locking hole 31A of the side frame 31.

As illustrated in FIG. 6, the first reinforcing portions 872 are ridges that reinforce the rectangular cylindrical portion 871 as diagonal-bracing, and extend from left parts 871L to right parts 871R in upper and lower walls of the rectangular cylindrical portion 871. Two first reinforcing portions 872 are provided side by side in the front-rear direction on each of the upper and lower walls of the rectangular cylindrical portion 871. In FIG. 6, in terms of the first reinforcing portions 872, a reference sign is assigned only to a representative one of them. A left part 872L of the first reinforcing portion 872 is a part corresponding to the left part 871L of the rectangular cylindrical portion 871, and extends so as to be inclined such that a projection dimension from a corresponding one of the upper and lower walls of the rectangular cylindrical portion 871 is gradually increased toward the right side. A right end of the left part 872L of the first reinforcing portion 872 is formed to have a dimension that allows the right end to abut with an opening of the locking hole 31A when the connection protruding portion 87 is inserted into the locking hole 31A of the side frame 31. Further, a right part 872R of the first reinforcing portion 872 is a part corresponding to the right part 871R of the rectangular cylindrical portion 871, and its right end integrally continues with the vertically extending portion 81. A stopper portion 872S extending perpendicularly to a corresponding one of the upper and lower walls of the rectangular cylindrical portion 871 is formed in a boundary between the left part 872L and the right part 872R of the first reinforcing portion 872.

As illustrated in FIG. 6, the second reinforcing portions 873 are ridges that reinforce the rectangular cylindrical portion 871 as diagonal-bracing, and extend from left parts 871L to right parts 871R of front and rear walls of the rectangular cylindrical portion 871. Two second reinforcing portions 873 are provided side by side in the up-down direction on each of the front and rear walls of the rectangular cylindrical portion 871. In FIG. 6, in terms of the second reinforcing portions 873, a reference sign is assigned only to a representative one of them. A left part 873L of the second reinforcing portion 873 is a part extending from near a left end of the left part 871L of the rectangular cylindrical portion 871 to a central part of the left part 871L in the right-left direction, and extends so as to be inclined such that a projection dimension from a corresponding one of the front and rear walls of the rectangular cylindrical portion 871 is gradually increased toward the right side. A right part 873R of the second reinforcing portion 873 is a part extending from a right end of the left part 873L to a right end of the right part 871R of the rectangular cylindrical portion 871, and a projecting dimension thereof from a corresponding one of the front and rear walls of the rectangular cylindrical portion 871 is constant. The right part 873R of the second reinforcing portion 873 is formed to have a dimension that allows the right part 873R to abut with the opening of the locking hole 31A when the connection protruding portion 87 is inserted into the locking hole 31A of the side frame 31. A right end of the right part 873R of the second reinforcing portion 873 integrally continues with the vertically extending portion 81.

Based on FIG. 3, the following describes a procedure of attaching the shield 60R to the right side face portion of the seat cushion 10. First, the switch member 70 is positioned with respect to the attachment region AR of the shield 60R. That is, the first projection portion 651 of the shield 60R is passed through the positioning hole 711B of the front flange portion 711 of the switch member 70, and the second projection portion 652 of the shield 60R is passed through the positioning hole 712B of the rear flange portion 712 of the switch member 70. Then, the locking bracket 80 is positioned with respect to the attachment region AR of the shield 60R. That is, the second projection portion 652 of the shield 60R is passed through the positioning hole 821B of the upper flange portion 821 of the locking bracket 80, and the third projection portion 653 of the shield 60R is passed through the positioning hole 831B of the lower flange portion 831 of the locking bracket 80. In this state, the switch member 70 and the locking bracket 80 are fastened to the shield 60R with screw threads T. That is, a screw thread T1 is passed through the screw-thread hole 711A of the switch member 70 and screwed into the first internal screw thread portion 631 so that the switch member 70 is fastened. Further, a screw thread T2 is passed through the screw-thread hole 821A of the locking bracket 80 and the screw-thread hole 712A of the switch member 70, and then screwed into the second internal screw thread portion 632 so that the locking bracket 80 and the switch member 70 are fastened together. Further, a screw thread T3 is passed through the screw-thread hole 831B of the locking bracket 80, and then screwed into the third internal screw thread portion 633 so that the locking bracket 80 is fastened.

Further, a screw thread T4 is passed through the screw-thread hole 714A of the switch member 70, and then screwed into the fourth internal screw thread portion 634 so that the switch member 70 is fastened. Hereby, the switch member 70 and the locking bracket 80 are attached to the shield 60R. At this time, as illustrated in FIGS. 2, 4, and 6, the rear end 851B of the slope face portion 851 of the hood portion 85 is positioned on a slightly rear side relative to the rear end of the connector portion 75, the right end 851R thereof is positioned generally right above the right end of the connector portion 75, and the left end 851L thereof is positioned so as to project relative to the left end of the connector portion 75 just by a dimension generally the same as a thickness dimension of the connector portion 75 in the right-left direction.

When the switch member 70 and the locking bracket 80 are attached to the shield 60R, the terminal portion of the wiring harness 77 (see FIG. 2) is connected to the connector portion 75 of the switch member 70. After that, as illustrated in FIG. 5, the connection protruding portion 87 of the locking bracket 80 is passed through the locking hole 31A of the right side frame 31, and the shield 60R is attached to the right side frame 31. At this time, the left parts 872L of the first reinforcing portions 872 of the connection protruding portion 87 and the left parts 873L of the second reinforcing portions 873 thereof guide the connection protruding portion 87 to be passed through the locking hole 31A by their inclined structure. As the connection protruding portion 87 is passed through the locking hole 31A, the engaging pawl 874 of the connection protruding portion 87 abuts with the lower peripheral portion of the locking hole 31A, so as to warp upward. When the stopper portion 872S of the first reinforcing portion 872 of the connection protruding portion 87 abuts, from the right side, with upper and lower peripheral portions of the locking hole 31A of the right side frame 31, the engaging pawl 874 of the connection protruding portion 87 returns to its original state due to an elastic restoring force, so as to be locked to the lower peripheral portion of the locking hole 31A. Hereby, the locking bracket 80 is locked to the right side frame 31. At this time, as illustrated in FIG. 4, the suspended portion 853 of the hood portion 85 is positioned on the left side relative to the right slide rail 40. On this account, when a foreign matter moves leftward on the slope face portion 851 of the hood portion 85 and falls down from the left end 851L, the foreign matter falls along the suspended portion 853 to a position that does not interfere with the slide rail 40.

The present embodiment thus configured has the following effects. The hood portion 85 is provided above the connector portion 75 of the switch member 70. Accordingly, even when a foreign matter enters from above into the space between the right side face portion of the seat cushion 10 and the shield 60R, it is possible to restrain an occurrence of a malfunction by restraining the foreign matter from abutting with the connector portion 75 of the switch member 70. Further, when the foreign matter abuts with the hood portion 85, the foreign matter moves leftward on the slope face portion 851 of the hood portion 85 due to gravity, and easily falls from the left end 851L of the slope face portion 851 of the hood portion 85. The foreign matter thus falling is discharged from a lower side of the space between the right side face portion of the seat cushion 10 and the shield 60R. Accordingly, it is possible to restrain the foreign matter from remaining in the space between the right side face portion of the seat cushion 10 and the shield 60R. Further, the upright wall portion 851B is provided in the hood portion 85. Hereby, when the foreign matter abutting with the hood portion 85 moves leftward on the slope face portion 851 of the hood portion 85 due to gravity, it is possible to restrain the foreign matter from falling from the slope face portion 851 of the hood portion 85 halfway without moving to the left end 851L of the slope face portion 851 of the hood portion 85. This makes it easy to guide the foreign matter to a direction where the foreign matter hardly affects the switch member 70. Further, the switch member 70 and the hood portion 85 are both attached to the shield 60R. Hereby, when the switch member 70 and the hood portion 85 are both attached to the shield 60R and the shield 60R is then attached to the right side face portion of the seat cushion 10, it is possible to restrain interference between the switch member 70 and the hood portion 85 during an attachment operation of the shield 60R.

A specific embodiment has been described above, but the invention is not limited to the appearance and the configuration described in the above embodiment, and various modifications, additions, and deletions are performable as far as they do not change a gist of the invention.

For example, the present embodiment exemplifies a structure in which the hood portion 85 covers only the upper side of the connector portion 75 of the switch member 70. However, the present invention is not limited to this. For example, the hood portion 85 may have a structure in which the hood portion 85 covers the upper side of the body portion 71 of the switch member 70, or the hood portion 85 may have a structure in which the hood portion 85 covers both upper sides of the body portion 71 and the connector portion 75 of the switch member 70.

Further, the present embodiment exemplifies a structure in which the hood portion 85 is formed integrally with the locking bracket 80. However, the present invention is not limited to this. The hood portion may be formed directly in the right side frame 31 or may be formed directly in the shield 60R. Further, the hood portion 85 may be manufactured as a different member, and be attached to the locking bracket 80, the right side frame 31, or the shield 60R in a subsequent step.

Further, the present embodiment exemplifies a structure in which the hood portion 85 is formed in a so-called shed-roof shape. However, the structure of the hood portion is not limited to this, and a hood portion formed in a saddle-roof shape or a hood portion formed horizontally to the floor F can be used.

Further, in the present embodiment, the present invention is applied to the right side face portion of the seat cushion 10. However, the present invention is not limited to this, and the present invention may be applied to the left side face portion of the seat cushion 10.

Further, in the present embodiment, the present invention is applied to a vehicle seat, but may be applied to seats to be provided in an airplane, a ship, a train, and the like.

What is claimed is:

1. A vehicle seat comprising:
a seat cushion;
a shield attached to a side face portion of the seat cushion;
an electrical component disposed between the side face portion and the shield; and
a hood portion provided above the electrical component between the side face portion and the shield so as to cover at least part of the electrical component.

2. The vehicle seat according to claim 1, wherein:
an upper part of the hood portion is at least partially inclined; and
a space between the side face portion and the shield is opened downward.

3. The vehicle seat according to claim 2, wherein
the hood portion is a planar body formed in a shed-roof shape.

4. The vehicle seat according to claim 2, wherein:
the hood portion is provided with an upright wall portion that guides a foreign matter to a lower end of a shed-roof shape of the hood portion when the foreign matter entering from above into the space between the side face portion and the shield abuts with the hood portion and moves on the hood portion due to gravity.

5. The vehicle seat according to claim 1, wherein
the electrical component and the hood portion are both attached to the shield.

6. The vehicle seat according to claim 1, wherein
the hood portion is integrated with the shield.

* * * * *